Patented Aug. 25, 1953

UNITED STATES PATENT OFFICE 2,650,227

2,650,227
DERIVATIVES OF 2:3-DIHYDRO-4-METHYL-FURO(3:2-c) QUINOLINE AND PREPARATION THEREOF

Helmut Timmler, Hans Andersag, and Stephan Breitner, Wuppertal-Elberfeld, Germany, assignors to Schenley Industries, Inc., New York, N. Y., a corporation of Delaware No Drawing. Application May 28, 1951, Serial No. 228,761. In Germany May 27, 1950

21 Claims. (Cl. 260—288)

This invention relates generally to the synthesis of novel organic chemical compounds and, more particularly, it is concerned with the synthesis of polynuclear heterocyclic compounds useful in chemotherapy.

This application is related to our copending applications Serial Nos. 228,762, 228,763, 228,764, and 228,765 filed concurrently herewith on May 28, 1951, as companion applications for compounds of the same generic series bearing an isomeric or isologous relationship to each other.

The novel compounds of this invention may be regarded as derived from 2:3-dihydro-4-methyl-furo(3:2-c) quinoline, which is represented by the formula:

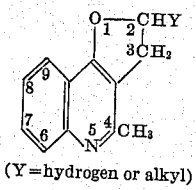

(Y=hydrogen or alkyl)

having a bridging group, linked to one pair of adjacent positions of the bz nucleus, which comprises a secondary amino group in a chain with two carbon atoms linked by a double bond, which may be represented by the formula:

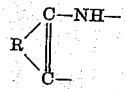

wherein R is a hydrocarbon chain, which may be saturated or unsaturated and which may in part constitute part of a homocyclic group, that with the two doubly linked carbon atoms of the above fragmentary formula, constitutes a homocyclic group.

These compounds have interesting and useful properties making them suitable for use in chemotherapy, particularly as analgesics, stimulants and as amoebicides.

The novel compounds of this invention can be obtained easily from bz-amino-2:3-dihydro-4-methyl-furo(3:2-c) quinolines, or such compounds having additionally an alkyl substituent at the 2-position, by treatment with nitrous acid, followed by reduction to yield the corresponding bz-hydrazino compounds which, when condensed with a keto compound of the formula:

wherein R has the meaning above assigned, yields the desired final products upon cyclization by heating with an acid under conditions favoring indole ring closure.

Among the carbonyl compounds that are suitable for use in the synthesis of compounds of this invention are hydroaromatic ketones having a reactive methylene group in the alpha position relative to the carbonyl group, such as cyclopentanone ($C_5H_8O$), cyclohexanone ($C_6H_{10}O$), tetralone (1-keto-2:3:4-trihydronaphthalene) and the like.

The indole ring closure, whereby the precursor hydrozone intermediates are converted to the desired polynuclear heterocyclic final products, may be effected by use of any of the reagents that are usually employed for analogous purposes in the synthesis of compounds having an indole nucleus. Reagents suitable for this purpose include glacial acetic acid, dilute or concentrated mineral acids or zinc chloride.

The process according to this invention can be represented, in outline form, as follows:

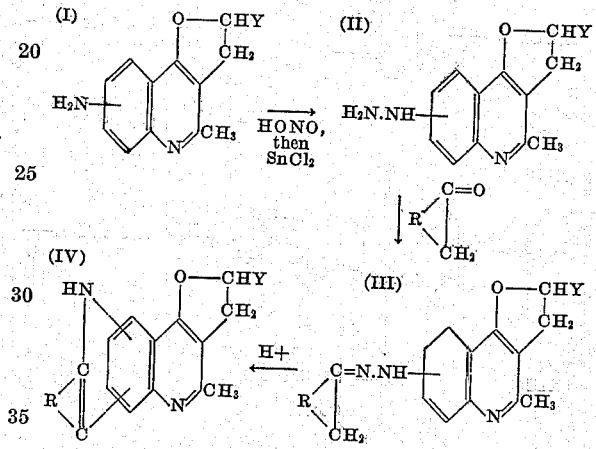

The bz-amino-2:3-dihydro-4-methyl-furo-(3:2-c) quinoline starting materials used in this process can be produced easily by nitration, followed by reduction, of the cyclized Schiff's base type compound obtained by condensing aniline, or a nuclearly substituted aniline, with 2-acetyl-4-hydroxy-butanoic acid lactone. These reactions may be represented as follows:

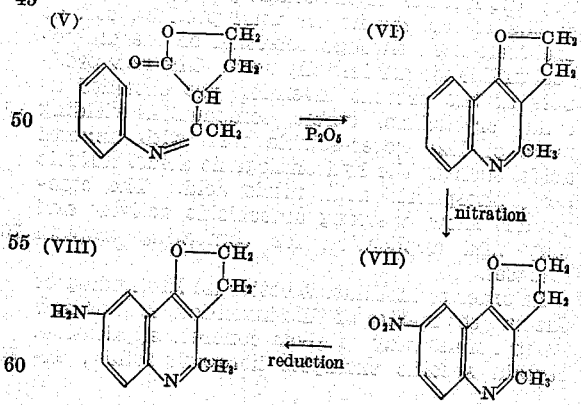

Alternatively, instead of a Schiff's base type compound (V) derived from aniline and 2-acetyl-4-hydroxy-butanoic acid lactone, a similar compound may be formed and cyclized using an ortho, meta or para aminoacetanilide, which when hydrolyzed to liberate the free base, yields the desired bz - amino - 2:3 - dihydro - 4 - methyl-furo(3:2-c) quinoline. Depending upon whether the ortho, meta or para isomer is used in making the Schiff's base, the cyclized compound obtained will have the amino group in the 6, the 7 or 9, or the 8 positions, respectively.

The bz-amino-2:3-dihydro-2-alkyl-4-methyl-furo(3:2-c) quinoline starting materials used in the process of this invention can be produced easily by condensing any chosen one of the three isomeric forms of aminoacetanilide with acetoacetic ester to produce a Schiff's base type compound, cyclizing this compound to obtain the corresponding bz-acetylamino - 2 - methyl - 4- alkoxy (or hydroxy) quinoline, treating this product with an alkylene halide under conditions favoring ether formation to obtain the corresponding 4-alkyleneoxy compound, intramolecularly rearranging this product by heating in a high-boiling organic solvent to produce the corresponding bz-amino-2-methyl-3-alkenyl-4-hydroxy-quinoline, then cyclizing this product by treatment with an acid. These reactions, in outline form, may be represented as follows:

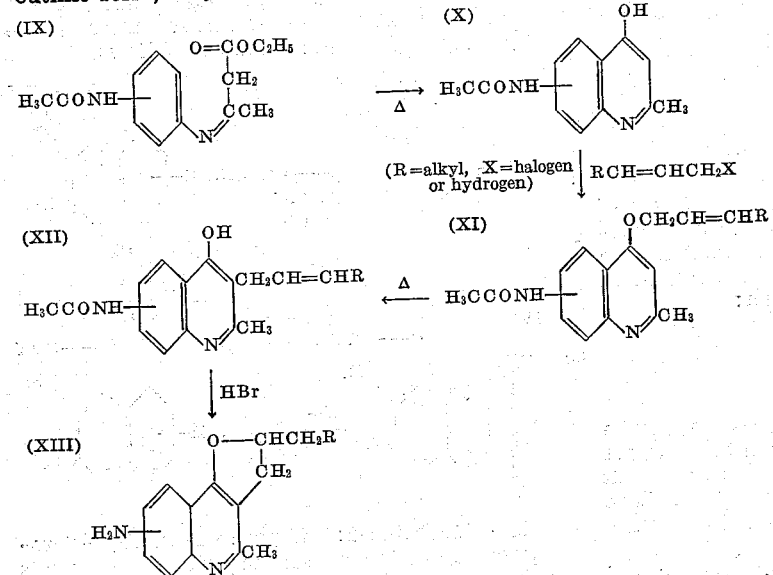

It will be apparent that the alkyl group which appears as a substituent in the 2-position of the final product can be made any desired alkyl group by selection of a suitable alkenyl halide for use in the synthesis of intermediate XI, and that the location of the amino group, substituent of the bz-nucleus in the final product, can be predetermined through selection of the aminoacetanilide isomer initially used. The new products of the present invention are obtained as solid, crystalline, stable compounds, yielding more or less water-soluble salts with mineral acids, such as the hydrohalogenic acids, sulfuric acid, phosphoric acid, nitric acid. The compounds show a strong ameobicide activity and may find application for combating tropical diseases.

In order to facilitate a better understanding of the subject matter of this invention, and of how its principles may be given concrete application, certain specific examples herewith follow, explaining in detail the mode of synthesis of certain particular compounds, but it is clearly to be understood that these examples are provided by way of illustration merely and are not to be construed as limitations upon the scope of the invention.

*Example 1*

Synthesis of the compound represented by the formula:

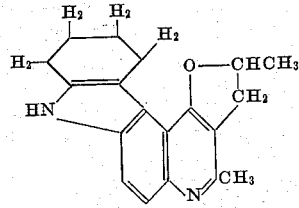

About 21.4 grams of 2:3-dihydro-2:4-dimethyl-8-amino-furo(3:2-c) quinoline are dissolved in 170 cc. of concentrated hydrochloric acid and this amino compound is diazotized with 6.9 grams of sodium nitrite in the usual manner. This diazo-solution is added, in portions, to a solution of 45 grams of stannous chloride in 45 cc. of concentrated hydrochloric acid at a temperature below 5° C., and the solution is stirred for a brief period of time, then it is poured into a caustic soda solution and extracted with methylene chloride.

The 8-hydrazino compound thus obtained melts at 162° C. Approximately 22.9 grams of this hydrazino compound are dissolved in 25 cc. of alcohol and the solution is heated with 9.8 grams of cyclohexanone on the water-bath for a half hour. After recrystallization from the solution of methylene chloride and ether, the hydrazone derivative melting at 189° C., is obtained. This compound has the formula:

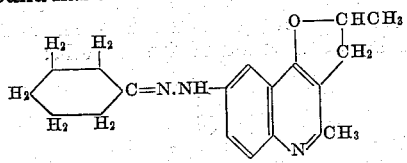

About 25 grams of this hydrazone are introduced into half a liter of 20% hydrochloric acid and heated on the water-bath for a half hour. On cooling, the hydrochloride of the indole derivative formed, crystallizes. This hydrochloride salt is more easily soluble in water than in hydrochloric acid and, after being recrystallized from water, its melting point is above 300° C. The starting material, 2:3-dihydro-2:4-dimethyl-8-amino-furo(3:2-c)quinoline, used in this synthesis may be prepared as follows:

About 150 grams of 4-aminoacetanilide are boiled with 130 grams of ethyl acetoacetate in half a liter of methyl alcohol, under reflux, for 4 hours. After cooling the crystal paste is removed and washed with methyl alcohol. This Schiff's base type compound melts at 182° C.

Approximately 200 grams of this compound are stirred in portions into one liter of alpha-chloronaphthalene at 250° C. After completion of the reaction, the mixture is cooled and the crystallized 4-hydroxy-6-acetylamino-quinaldine is removed and washed with benzene. The product so obtained does not melt at temperatures below 300° C.

Approximately 216 grams of 4-hydroxy-6-acetylamino-quinaldine are introduced, at boiling temperature, into a sodium ethylate solution prepared by adding 32 grams of sodium to 1 liter of alcohol, and the resultant mixture is mixed, in portions, with 120 grams of allyl bromide, with further boiling. After boiling for 3 hours, most of the alcohol is distilled off and the allyl ether of 4-hydroxy-6-acetylamino-quinaldine is precipitated by addition of ether. After washing with caustic soda solution and water, the allyl ether is recrystallized from a solution of alcohol and ether. This product melts at 176° C.

About 150 grams of this allyl ether are stirred into half a liter of alpha-chloronaphthalene at 220-230° C. After 10 minutes, the solution is allowed to cool while stirring, then the precipitated product is removed and washed with benzene. The 3 - allyl - 4 - hydroxy - acetamino-quinaldine thus obtained does not melt below 300° C.

Approximately 125 grams of 3-allyl-4-hydroxy-6-acetamino-quinaldine are stirred at room temperature into 500 cc. of hydrobromic acid ($d=1.7$) and the mixture is stirred for 15 hours. Thereupon a double volume of water is added to the mixture, which is then boiled until the starting product is completely dissolved. The solution is poured into dilute caustic soda solution and the free desired 2:3-dihydro-4-methyl-8-amino-furo-(3:2 - c)quinoline compound is precipitated thereby. After recrystallization from a solution of methylene chloride and ether, the product melts at 193° C.

*Example 2*

Synthesis of the compound represented by the formula:

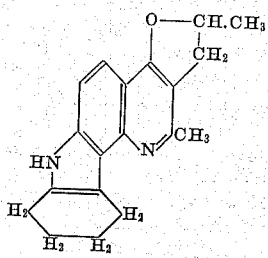

The operations described in Example 1 are repeated, excepting that the starting material used is 2:3-dihydro-2:4-dimethyl-7-amino-furo(3:2-c) quinoline. The 7-hydrazino intermediate has a melting point of 173-174° C. The final product obtained melts at 204° C. and its hydrochloride at 293° C. The starting material is obtained by treatment of m-amino-acetanilide as described in Example 1, followed by hydrolysis of the acetyl group by boiling with dilute hydrochloric acid. The intermediate 2-methyl-4-hydroxy-7-acetylamino-quinoline melts at 153° C.

*Example 3*

Synthesis of the compound represented by the formula:

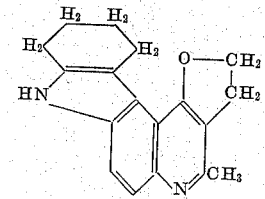

A Schiff's base type compound obtained by condensing aniline and 2-acetyl-4-hydroxy-butanoic acid lactone, is cyclized by heating with phosphorus pentoxide and purified by recrystallization in the usual manner. Approximately 200 parts of this product are dissolved in 900 parts of concentrated sulfuric acid and a mixture of 98 parts of nitric acid ($d=1.4$) and 270 parts of concentrated sulfuric acid is slowly added thereto at 5° C. The mixture is left standing at ordinary room temperature for a half hour, then it is cast onto ice and the free base is precipitated by addition of ammonia. The reaction product is recrystallized twice from aqueous acetone to remove the simultaneously formed isomeric 6-nitro compound. The 8-nitro compound of furanoquinaldine is obtained as yellow needles, melting at 204° C., and its hydrochloride melts at 237° C.

About 2.5 parts of the above 8-nitro compound are dissolved in 225 parts of 20% hydrochloric acid and the mixture is added to 23 parts of a 66% stannous chloride solution at 80° C. Five minutes after completion of the vigorously proceeding reaction, the solution is poured into 100 parts of 35% caustic soda solution and the reaction product is taken up with ether. After evaporating the ether, the product is recrystallized from ethyl acetate. Colorless needles of the 8-amino compound, melting at 188° C., are obtained. The 8-acetylamino compound melts at 245° C. By reducing the crude nitration product in addition to the desired 8-amino compound, small amounts of the 6-amino compound, melting at 138° C., are obtained from the mother liquors (the constitution may be determined by conversion into the corresponding chlorine compounds.

The 8-amino compound is converted into the 8-hydrazino compound by treatment as indicated in Example 1. The 8-hydrazino compound, after being recrystallized from benzene, melts at 173° C. The desired final product is obtained by condensation of this hydrazino intermediate with cyclohexanone by operations as described in Example 1. The free base final product melts at 290° C.

In the same manner, the analogous methyl-substituted compounds of the substance of the above formula, having melting points of 262° C., 293° C. and 297° C., respectively, are obtained by substituting for the cyclohexanone 2-methylcyclohexanone, 3-methylcyclohexanone and 4-methylcyclohexanone.

Example 4

Synthesis of the compound represented by the formula:

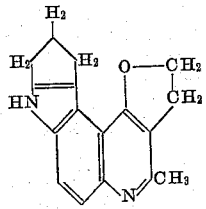

By repeating the operations described in Example 3, but substituting cyclopentanone for the cyclohexanone there used, the compound of the above formula is obtained, melting point 280° C.

Example 5

Synthesis of the compound represented by the formula:

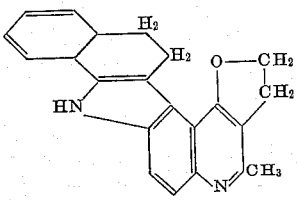

This compound, melting point above 300° C., is obtained by repeating the operations described in Example 3, but substituting alpha-tetralone (1 - keto - 2:3:4 - trihydronaphthalene) for the cyclohexanone there employed.

Example 6

Synthesis of the compound represented by the formula:

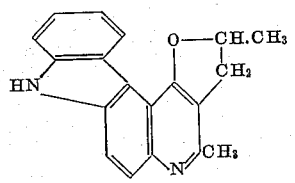

By repeating the operations described in Example 1 but substituting Δ-2,4-cyclohexadieneone for the cyclohexanone there specified, the compound of the above formula may be obtained, melting point, 262° C.

Example 7

Synthesis of the compound represented by the formula:

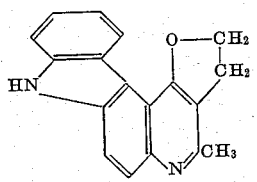

By repeating the operations described in Example 3, substituting Δ-2,4-cyclohexadieneone for the cyclohexanone there specified, the compound of the above formula may be obtained, melting point 272° C.

Example 8

Synthesis of the compound represented by the formula:

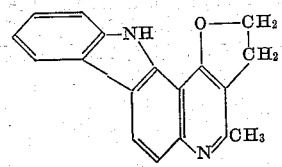

About 25 parts of a Schiff's base type compound prepared from 2-amino-carbazole and acetobutyrolactone (M. P. 250° C.) are heated in 200 parts of paraffin oil to 250° C. and 50 parts of phosphorus pentoxide are slowly added thereto. This mixture is allowed to stand at 250° C. for one hour, then after cooling, the supernatant liquor is decanted and the residue is washed with a mixture of petroleum and ether. It is then decomposed by introducing steam, rendered alkaline, shaken out with methylene chloride, the solvent evaporated and the methylene chloride residue recrystallized from methanol. Slightly yellowish prismatic needles melting at 267° C. are obtained of the product having the above formula.

Example 9

Synthesis of the compound having the formula:

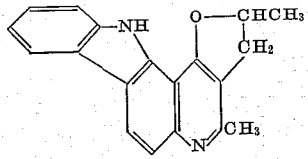

Approximately 72.04 grams of 2-aminocarbazole are boiled for 24 hours under reflux with 52 grams of ethyl acetoacetate in a half liter of methanol to which a few drops of hydrochloric acid have been added. The undissolved material in the mixture is removed by filtering and a portion of the methanol is evaporated, causing the Schiff's base to precipitate as crystals.

About 50 grams of this compound are introduced with stirring into 250 cc. of alpha-chloronaphthalene at 250° C. and the indolo-quinaldine derivative which forms is removed after cooling and washed with benzene. Its melting point is above 300° C.

Approximately 24.8 grams of this substance are dissolved in a sodium ethylate solution, obtained by adding 2.3 grams of sodium to 150 cc. of alcohol, and this solution is mixed with 12 grams of allyl bromide at boiling temperature and the mixture is boiled for 3 hours. Most of the alcohol is then removed by distillation and the allyl ether is precipitated by addition of ether, removed and washed with dilute caustic soda solution and water. When rapidly heated, the compound melts at 210–215° C. and then solidifies again, probably due to allyl rearrangement.

About 20 grams of this allyl ether are stirred into 60 cc. of alpha-chloronaphthalene at 200° C. The 3-allyl-4-hydroxy-indoloquinaldine derivative which forms is removed, after cooling, and washed with benzene. This compound does not melt below 300° C.

Approximately 15 grams of this compound are stirred into 100 cc. of hydrobromic acid (d=1.7) and the mixture is allowed to stand for 24 hours, then it is mixed with water and rendered alkaline by addition of caustic soda solution. The indolo-furo-quinaldine compound of the above formula thus produced is taken up with methylene chloride; the solvent is evaporated and the residue is a compound, melting at 262° C. which yields high-melting crystalline salts when treated with mineral acids.

Having thus described the subject matter of this invention, what it is desired to secure by Letters Patent is:

1. As a novel composition of matter, a chemical compound represented by the formula:

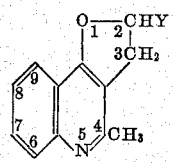

wherein Y is a substituent of the group consisting of hydrogen and methyl, having a bridging group across one pair of adjacent positions of the bz-nucleus of the fragmentary formula:

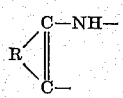

wherein R is a hydrocarbon chain comprising at most four carbon atoms that constitutes, with the doubly linked carbon atoms of the above fragmentary formula, a homocyclic hydrocarbon group.

2. A compound as defined in claim 1 wherein Y is hydrogen.
3. A compound as defined in claim 2 wherein R is the group —CH$_2$CH$_2$CH$_2$CH$_2$—.
4. A compound as defined in claim 2 wherein R is the group —CH$_2$CH$_2$CH$_2$—.
5. A compound as defined in claim 2 wherein R is the group:

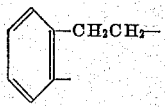

6. A compound as defined in claim 2 wherein R is the group —CH=CH.CH=CH—.
7. A compound as defined in claim 1 wherein Y is a methyl group.
8. A compound as defined in claim 7 wherein R is the group —CH$_2$CH$_2$CH$_2$CH$_2$—.
9. A compound as defined in claim 7 wherein R is the group —CH=CH.CH=CH—.
10. A compound represented by the formula:

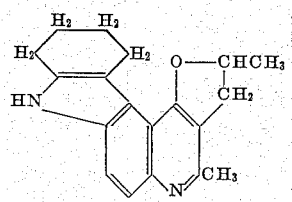

11. A compound represented by the formula:

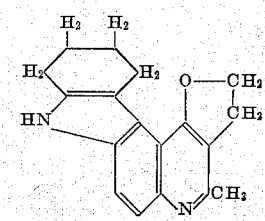

12. A compound represented by the formula:

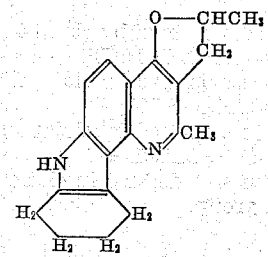

13. A compound represented by the formula:

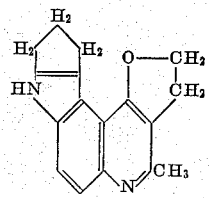

14. A compound represented by the formula:

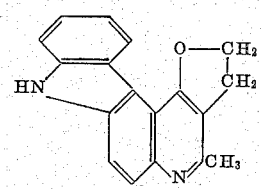

15. Process for the synthesis of chemical compounds that is represented as follows:

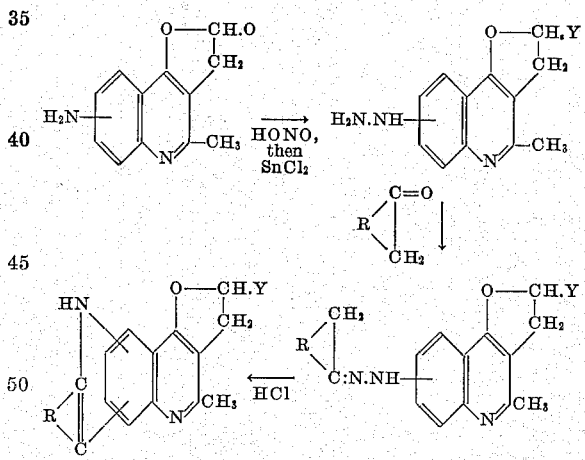

wherein Y is a substituent of the group consisting of hydrogen and alkyl, and R is a hydrocarbon chain comprising at most four carbon atoms that constitutes, with the carbon atoms to which it is linked, a homocyclic hydrocarbon group characterized in that the amino starting compound of the formula first above indicated is diazotized in an aqueous acidic medium with nitrous acid to yield a diazonium compound which is reduced, in the cold, in the same medium, using stannous chloride as the reducing agent, to yield the corresponding hydrazino compound which is isolated, dissolved in an alcoholic solvent medium and condensed with a ketone of the formula

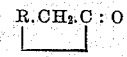

to obtain the ketohydrazone of the formula indicated, which is heated with aqueous hydrochloric acid to cause cyclization and formation of the desired final product indicated.

16. The process defined by claim 15 wherein Y is hydrogen.

17. The process defined by claim 16 wherein R is the group —CH₂CH₂CH₂CH₂—.

18. The process defined by claim 16 wherein R is the group —CH₂CH₂CH₂—.

19. The process defined by claim 16 wherein R is the group —CH=CH.CH=CH—.

20. The process as defined in claim 15 wherein Y is a methyl group.

21. The process as defined in claim 20 wherein R is the group —CH₂CH₂CH₂CH₂—.

HELMUT TIMMLER.
HANS ANDERSAG.
STEPHAN BREITNER.

References Cited in the file of this patent

Fierer et al., "Organic Chemistry" (D. C. Heath and Co.; Boston 1944), page 32.